(12) United States Patent
Kelley et al.

(10) Patent No.: US 10,866,095 B2
(45) Date of Patent: Dec. 15, 2020

(54) SURVEY ROD BOOT

(71) Applicant: K & D Manufacturing, LLC, Port St. Lucie, FL (US)

(72) Inventors: David Varn Kelley, Port St. Lucie, FL (US); Keith Alan Martinez, Port St. Lucie, FL (US)

(73) Assignee: K & D MANUFACTURING, LLC, Port Saint Lucie, FL (US)

( * ) Notice: Subject to any disclaimer, the term of this patent is extended or adjusted under 35 U.S.C. 154(b) by 216 days.

(21) Appl. No.: 16/213,449

(22) Filed: Dec. 7, 2018

(65) Prior Publication Data

US 2019/0178644 A1    Jun. 13, 2019

Related U.S. Application Data

(60) Provisional application No. 62/596,066, filed on Dec. 7, 2017.

(51) Int. Cl.

| | |
|---|---|
| *G01C 15/06* | (2006.01) |
| *F16M 11/04* | (2006.01) |
| *F16M 11/22* | (2006.01) |
| F16M 11/20 | (2006.01) |
| F16M 13/00 | (2006.01) |

(52) U.S. Cl.
CPC .......... *G01C 15/06* (2013.01); *F16M 11/041* (2013.01); *F16M 11/22* (2013.01); *F16M 11/20* (2013.01); *F16M 13/005* (2013.01); *F16M 2200/027* (2013.01); *F16M 2200/08* (2013.01)

(58) Field of Classification Search
CPC ....... G01C 15/06; G01C 15/08; F16M 11/041
USPC .................................................... 33/293–296
See application file for complete search history.

(56) References Cited

U.S. PATENT DOCUMENTS

| | | | |
|---|---|---|---|
| 2,909,839 | A | 10/1959 | Miller |
| 3,239,176 | A * | 3/1966 | Johnson ................. G01C 15/06 248/166 |
| 3,441,239 | A | 4/1969 | Frost |
| 3,911,589 | A | 10/1975 | Myeress |
| 4,366,940 | A | 1/1983 | Vargas |
| 4,744,151 | A | 5/1988 | Wisniewski |
| 4,803,784 | A | 2/1989 | Miller |
| 4,926,561 | A * | 5/1990 | Miller .................... G01C 15/06 33/293 |
| 5,632,464 | A | 5/1997 | Aberle |
| 6,631,877 | B1 | 10/2003 | Crain |

(Continued)

*Primary Examiner* — George B Bennett
(74) *Attorney, Agent, or Firm* — Mark C. Johnson; Johnson Dalal

(57) ABSTRACT

A survey rod boot utilized with a survey rod, wherein the survey rod includes a rod support body defining a receiving aperture disposed on an upper surface of the rod support body, defining, with an enclosed inner sidewall of the rod support body, a receiving channel spanning from the receiving aperture into the rod support body, wherein the survey rod is disposed therein and frictionally retained by, and selectively, removably, and directly coupled to, the enclosed inner sidewall of the rod support body. The boot also has at least one cantilever member projecting in a direction outwardly from a sidewall of the rod support body and has a lower surface opposing an upper surface of the at least one cantilever member and defining a body resting plane so a user can obtain a measurement from the survey rod boot.

18 Claims, 5 Drawing Sheets

(56) References Cited

U.S. PATENT DOCUMENTS

| | | | |
|---|---|---|---|
| 6,662,458 B1* | 12/2003 | Antonelli | G01C 15/06 33/293 |
| 6,711,826 B2 | 3/2004 | Crain et al. | |
| 7,228,639 B2 | 6/2007 | Wilinson et al. | |
| 7,487,948 B2 | 2/2009 | Gardner | |
| 7,611,105 B1 | 11/2009 | Carazo | |
| 2006/0201008 A1* | 9/2006 | Yandrick | G01C 15/06 33/294 |
| 2018/0062677 A1* | 3/2018 | Ashjaee | F16M 11/041 |
| 2020/0018598 A1* | 1/2020 | Hollenstein | G01C 15/002 |
| 2020/0032950 A1* | 1/2020 | Abraham | F16M 11/247 |
| 2020/0141729 A1* | 5/2020 | Nishita | G01S 17/66 |
| 2020/0232596 A1* | 7/2020 | Lombardi | F16M 11/041 |

\* cited by examiner

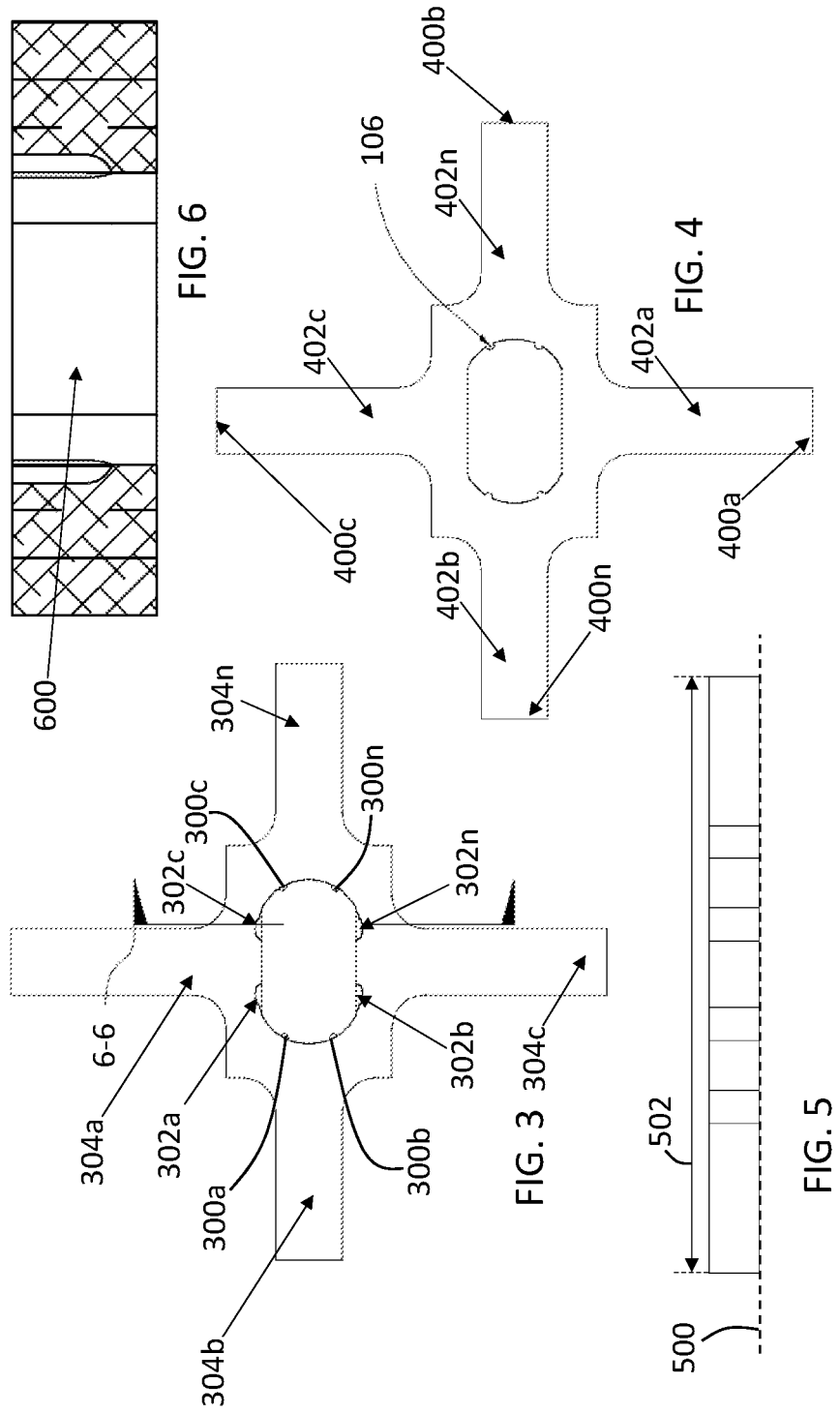

SURVEY ROD BOOT

CROSS-REFERENCE TO RELATED APPLICATION

This application claims priority to U.S. Provisional Patent Application No. 62/596,066 filed Dec. 7, 2017, the entirety of which is incorporated by reference.

FIELD OF THE INVENTION

The present invention relates generally to survey rod attachments, and, more particularly, relates to attachment or other devices configured to support a distal end of survey rods for facilitating in obtaining measurements.

BACKGROUND OF THE INVENTION

A survey or ranging rod is a surveying and/or measuring instrument used for marking the position and/or one or more dimension(s) of an object. Most survey rods are round or square sectioned; however, they can also be flat boards. Most also have markings at regular intervals, designed to indicate measurements. Said another way, these survey rods have measuring ruler capabilities, where a user can extend the rod up to the underside of a bridge or ceiling and then read the height at eye-level. Some known rods have their measuring faces made for when using laser levels as opposed to an optical level. These survey rods are generally made of wood, a metallic material, and/or a polymeric material that is substantially rigid. Problematically, however, those known rods make it difficult, if not impossible, to accurately measure the inner diameter of pipes, particularly those recessed within a ground surface and/or disposed within a body of water.

More specifically, those known rods do not provide users an effective way to ascertain when the distal end of the survey rod has reached the bottom inner surface of a pipe, called the "invert level." As such, the user is either prevented from ascertaining the inner diameter of a pipe or the dimensions obtained from the user is prone to inherent errors. This can be problematic as the invert is an important datum for determining the functioning or flowline of a piping system. Those known rods (or attachments thereto) also prevent a user from utilizing the rod for its conventional purpose and/or measuring an outer diameter of a pipe.

Therefore, a need exists to overcome the problems with the prior art as discussed above.

SUMMARY OF THE INVENTION

The invention provides a survey rod boot that overcomes the hereinafore-mentioned disadvantages of the heretofore-known devices and methods of this general type and that enables users to effectively, safely, and efficiently measure dimensions associated with a pipe, particularly the invert level.

With the foregoing and other objects in view, there is provided, in accordance with the invention, a survey rod boot assembly having a rod support body with an upper surface, a lower surface opposing the upper surface of the rod support body, and a sidewall. The rod support body also defines a receiving aperture disposed on the upper surface of the rod support body and defines, with an enclosed inner sidewall of the rod support body, a receiving channel spanning from the receiving aperture into the rod support body, wherein the enclosed inner sidewall of the rod support body may be of a deformably resilient material. The rod support body also includes at least one cantilever member projecting in a direction outwardly from the sidewall of the rod support body and terminating at a cantilevered free end, wherein the at least one cantilever member has an upper surface and a lower surface opposing the upper surface of the at least one cantilever member and defines, with the lower surface of the rod surface body, a body resting plane for placement on a pipe.

In accordance with a further feature of the present invention, the receiving channel span from the receiving aperture to an exit aperture disposed on the lower surface of the rod support body.

In accordance with another feature, an embodiment of the present invention includes the rod support body having a plurality of ribs projecting from the enclosed inner sidewall and into the receiving channel, the plurality of ribs disposed on opposing sides of the enclosed inner sidewall.

In accordance with yet another feature, an embodiment of the present invention also includes the enclosed inner sidewall having at least one recessed platform having an upper surface and defining a receiving sub-channel spanning from the upper surface of the at least one recessed platform to the receiving aperture of the rod support body.

In accordance with an additional feature, an embodiment of the present invention also includes the enclosed inner sidewall having a plurality of recessed platforms, wherein each have an upper surface and defining a receiving sub-channel spanning from the upper surface of each respective plurality of recessed platforms to the receiving aperture of the rod support body, wherein two of the plurality of recessed platforms are disposed on opposing sides of the enclosed inner sidewall.

In accordance with a further feature, an embodiment of the present invention also includes the support body having a plurality, including up to four, cantilever members, wherein each project in a direction outwardly from the sidewall of the rod support body, terminate at a cantilevered free end, have an upper surface, and have a lower surface opposing the upper surface of said cantilever member and define, with the lower surface of the rod surface body, the body resting plane. In one embodiment, each of the cantilever members are disposed at substantially orthogonal orientations with respect to two adjacent cantilever members.

In accordance with a further feature of the present invention, the body resting planes defined by each of the plurality of cantilever members and the lower surface of the rod surface body are co-planar.

In accordance with another feature, an embodiment of the present invention also includes a survey rod having a free proximal end, a free distal end opposing the free proximal end, a rod length separating the free proximal and distal ends of the survey rod, and a front face with a plurality of indicia corresponding to incremental distances disposed along the rod length, wherein the receiving aperture is shaped and sized to receive the free distal end of the survey rod and the rod support body is selectively removably coupled to the survey rod.

In accordance with yet another feature of the present invention, the free distal end of the survey rod is flush with the lower surface of the rod support body.

In accordance with another feature, an embodiment of the present invention also includes a rod area defined by a cross-section of the survey rod along the rod length and includes a receiving aperture area defined by edges of the rod support body defining the receiving aperture when the rod support body is uncoupled with the survey rod, wherein the receiving aperture area is less than or equal to the rod area.

Also in accordance with the present invention and in combination with a survey rod having a free proximal end, a free distal end opposing the free proximal end, a rod length separating the free proximal and distal ends of the survey rod, and a front face with a plurality of indicia corresponding to incremental distances disposed along the rod length, an improvement is disclosed that includes a rod support body. The rod support body include an upper surface, a lower surface opposing the upper surface of the rod support body, and a sidewall, defines a receiving aperture disposed on the upper surface of the rod support body, defines, with an enclosed inner sidewall of the rod support body, a receiving channel spanning from the receiving aperture into the rod support body, wherein the receiving aperture and the receiving channel with the survey rod disposed therein. The survey rod frictionally is retained by, and selectively, removably, and directly coupled to, the enclosed inner sidewall of the rod support body. The body also includes at least one cantilever member projecting in a direction outwardly from the sidewall of the rod support body and terminating at a cantilevered free end, wherein the at least one cantilever member has an upper surface and a lower surface opposing the upper surface of the at least one cantilever member and defines a body resting plane.

Although the invention is illustrated and described herein as embodied in a survey rod boot assembly configured to attach to a survey rod, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the rod support body, spanning from a lower surface thereon to an upper surface thereon.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 3 is a top plan view of the survey rod boot in FIG. 1;

FIG. 4 is a bottom plan view of the survey rod boot in FIG. 1;

FIG. 5 is an elevational side view of the survey rod boot in FIG. 1;

FIG. 6 is a cross-sectional view of the survey rod boot, along section line 6-6, in FIG. 3;

DETAILED DESCRIPTION

Figure 1:
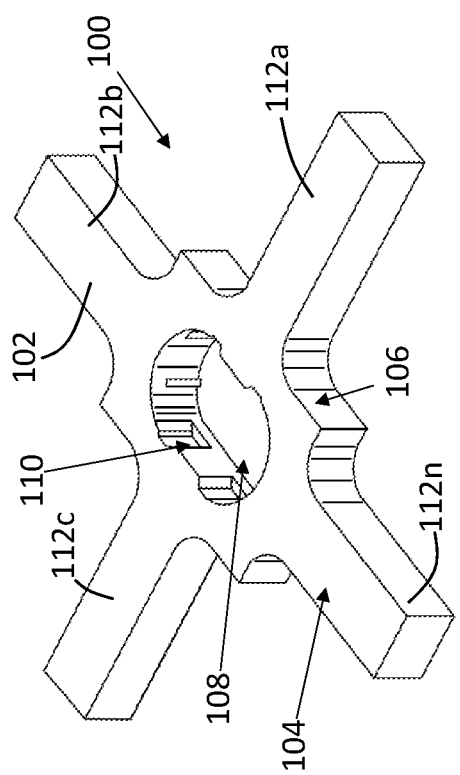
FIG. 1 is a perspective downward-looking view of a survey rod boot in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

Figure 2:
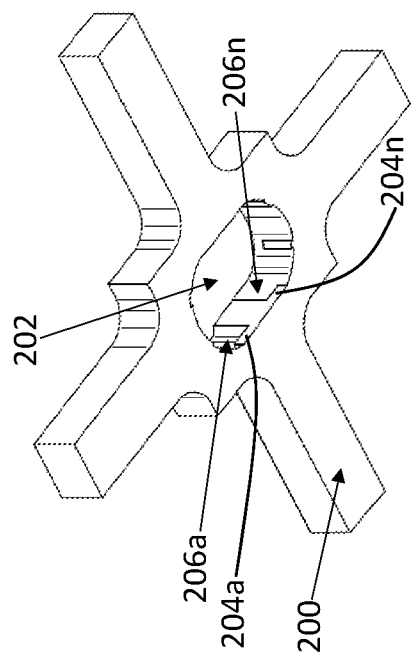
FIG. 2 is a perspective upward-looking view of the survey rod boot in FIG. 1.

The present invention provides a novel and efficient survey rod boot that is operably configured to couple with a survey rod to effectively and efficiently measure one or more pipe dimensions, in particular an invert level associated with a pipe. Referring now to FIGS. 1-2 and FIGS. 7-8, one embodiment of the present invention is shown in perspective views. FIGS. 1-2, along with other figures depicted herein, show several advantageous features of the present invention, but, as will be described below, the invention can be provided in several shapes, sizes, combinations of features and components, and varying numbers and functions of the components. The first example of a survey rod boot assembly 100 includes a rod support body or survey rod boot 102 that is operably configured to attach to (or is permanently attached to) a survey rod 700, i.e., an elongated tool with measurement indicia disposed thereon. Beneficially, the survey rod boot assembly 100 is operable to be placed adjacent and/or coupled to a pipe for accurate and efficient measurement(s) of said pipe, in particular the invert level.

Figure 8:
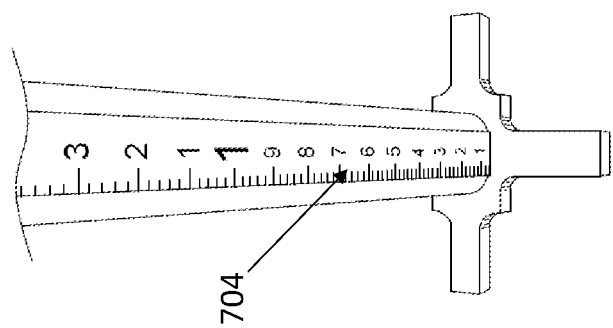
FIG. 8 is a perspective view of an exemplary survey rod coupled to the survey rod boot in accordance with one embodiment of the present invention.
Figure 7:
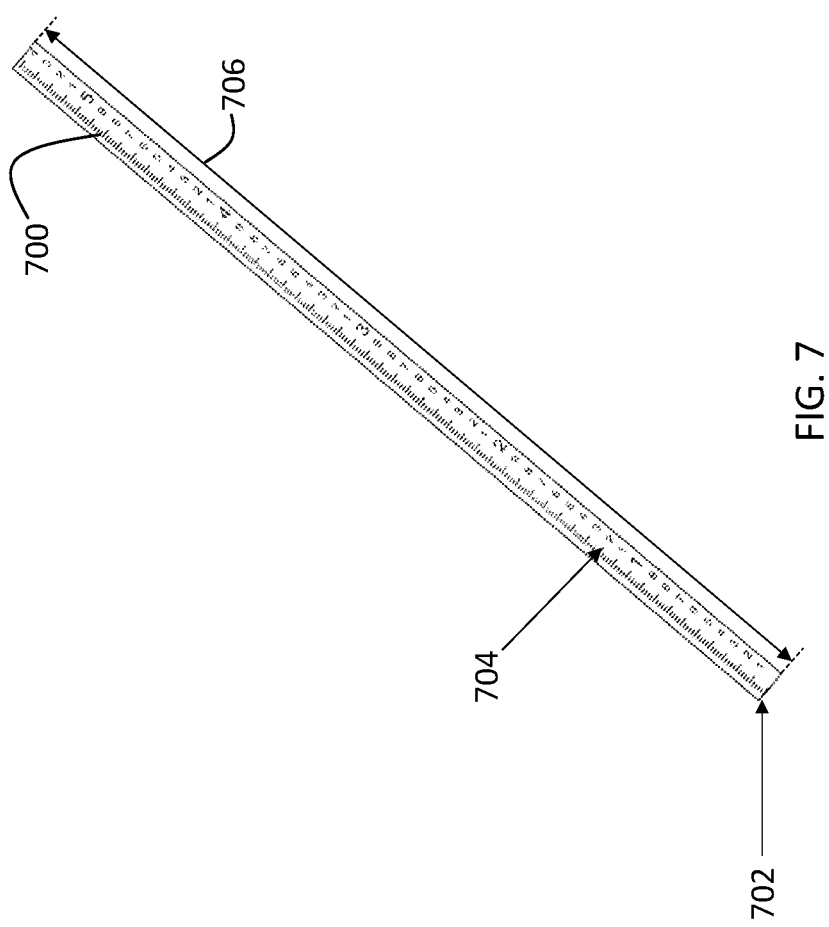
FIG. 7 is a perspective view of an exemplary survey rod utilized with the survey rod boot depicted in FIG. 1.

The rod support body 102 has an upper surface 104, a lower surface 200 that is opposing the upper surface 104, and a sidewall 106. It should be understood that terms such as, "front," "rear," "side," upper," "lower," and the like are indicated from a particular reference point of a viewer viewing the body 102, and may change based on perspective. The rod support body 102 defines a receiving aperture 108 disposed on the upper surface 104 of the rod support body 102. The body 102 also defines, with an enclosed inner sidewall 110 of the rod support body 102, a receiving channel 600 (shown best in FIG. 6) that spans from the receiving aperture 108 into the rod support body 102. As best seen in FIGS. 7-8, the receiving aperture 108 and receiving channel are shaped and sized to receive a portion of the survey rod 700. In preferred embodiments, the receiving channel 600 spans from the receiving aperture 108 to an exit aperture 202 disposed on the lower surface 200 of the rod support body 102. In other embodiments, the receiving channel 600 may span into the rod support body 102 greater than 50% of the overall thickness of the rod support body 102.

In one embodiment, the receiving aperture 108 is sized and shaped to be smaller than a distal end 702 of the survey rod 700. Opposing the distal end 702 of the survey rod 700 is a proximal end 704, wherein a rod length 706 separates the distal and proximal ends 702, 704. As such, the support body 102, including the enclosed inner sidewall, is of a deformably resilient material, e.g., natural rubber having an exemplary hardness of approximately 20-50 shore A, that is operably configured to deform, surround, and frictionally retain the distal end 702 or other portions of the survey rod 700 along the rod length 706. When the survey rod 700 is removed, the body 102 and the receiving aperture 108 and/or receiving channel 600 return to their static state size/shape. In other embodiments, the body 102 may be of another polymeric material and/or may be of a metallic or ceramic material. The receiving aperture 108 and/or channel 600 may also be shaped and/or sized (e.g., ovally shaped or rectangular and approximately 1.5×2.5 inches—width× length) to substantially correspond to and/or equal the shape and/or size of the survey rod 700 (e.g., rectangular and approximately 1.5×2.5 inches—width×length). In additional embodiments, the body 102 may include one or more fastener(s) to secure and/or retain the survey rod 700 to the support body 102 during use. Additionally, the material of the rod support body 102 may be water resistant, as the assembly 100 may be used in wet environments where pipe inverts are generally located.

With reference to FIGS. 1-3, the rod support body 102 may also include one or more rib(s) 300a-n, wherein "n" represents any number greater than one. The rib(s) 300a-n may span longitudinally along the inner sidewall 110 and project therefrom (approximately 50-250 mils) and into the receiving channel 600 to grab and retain the survey rod when inserted therein. The plurality of rib(s) 300a-n may be disposed on opposing sides of the enclosed inner sidewall 110 to provide uniform and leveled retainment of the survey rod 700 when selectively coupled thereto. To quickly remove the survey rod 700, the user may place the lower surface 200 of the body 102 on a round surface, place his or her foot on the upper surface 104 of the rod support body 102, and apply a tensile force, e.g., 1-2 lbf, on the survey rod 700 away from the upper surface 104 of the rod support body 102.

In another embodiment, the enclosed inner sidewall 110 may include one or more recessed platform(s) 204a-n, wherein each of the platform(s) 204a-n have upper surface(s) 302a-n and define receiving sub-channel(s) 206a-n spanning from the upper surface of each platform to the receiving aperture 108 of the rod support body 102. The receiving sub-channel(s) 206a-n enable the user to more quickly remove the survey rod 700 by creating space (e.g., approximately 0.5 to 1 inches) for the user to place his or her figures to facilitate in removal and/or place the survey rod 700 therein. In one embodiment, two of the plurality of recessed platform(s) 204a-n are disposed on opposing sides of the enclosed inner sidewall 110.

With reference to FIGS. 1-5, the rod support body 102 beneficially includes one or more cantilever member(s) 112a-n projecting in a direction outwardly from the sidewall 106 of the rod support body 102, and terminating at cantilevered free end(s) 400a-n. The cantilever member(s) 112a-n provide a stabilization and support structure for obtaining effective measurements and/or distances on a pipe, particularly an invert level within a pipe. The one or more cantilever member(s) 112a-n may have upper surface(s) 304a-n and lower surface(s) 402a-n opposing each respective upper surface. The dimension separating the upper and lower surfaces of cantilever member(s) 112a-n is the "thickness" of the cantilever member(s) 112a-n. In one embodiment, the cantilever member(s) 112a-n are of a uniform thickness, e.g., approximately 0.75 inches, which may substantially equal to the thickness of the body 102 (as best seen in FIG. 5). Said differently, each of the cantilever member(s) 112a-n may define a body resting plane 500 with the lower surface 402 thereon. In one embodiment, all of the lower surface(s) 402a-n of the cantilever member(s) 112a-n, across the entire surface area of the lower surface(s), and the lower surface 200 of the body 102 are co-planar with one another, thereby providing an omni-directional device or platform for measuring up to four invert levels on pipes, simultaneously (sometimes having openings that all oppose one another).

In one embodiment, two or more of the cantilever member(s) 112a-n are disposed at substantially orthogonal orientations with respect to one another. Said another way, the cantilever member(s) may be disposed at approximately 90° with respect to one another, +/−10-15°, provide multi-directional measuring of two or more pipe inverts. In one embodiment, four cantilever member(s) 112a-n are disposed at substantially orthogonal orientations with respect to two adjacent cantilever members as shown best in the figures. The cantilever member(s) 112a-n may be of an oblong shape and may extend approximately 2.5-3 inches away from the rod support body 102, thereby creating an overall length 500 of the body 102 of approximately 8-10 inches. Exemplary sizes and shapes of the rod support body 102, apertures 108, 202, and cantilever member(s) 112a-n have been depicted in FIGS. 1-6 and described above, but may, however, vary based on design and/or manufacturing constraints and/or applications.

In conventional use of a survey rod 700 with respect to pipe invert, a user is required to balance the distal end 702 of the survey rod 700 adjacent to a target beginning surface of an inverted pipe and/or rest the distal end 702 of the survey rod 700 on the target beginning surface (which typically does not provide enough surface area to provide sufficient or level support for the distal end 702 of the survey rod 700, i.e., it slips off the pipe surface. The present invention, however, solves said problem. With reference to FIGS. 7-13, an exemplary boot coupling and measurement process can be seen.

Figure 11:
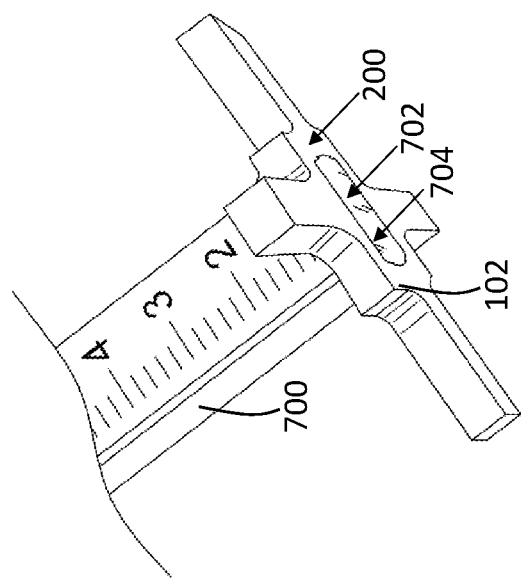
FIG. 11 is a perspective upward-looking view of the exemplary survey rod coupled to the survey rod boot in accordance with one embodiment of the present invention.
Figure 10:
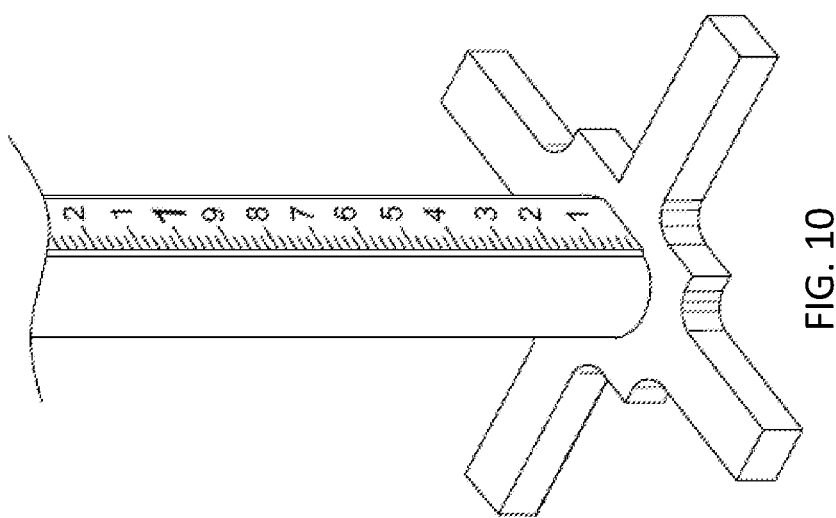
FIG. 10 is a close-up view of the exemplary survey rod coupled to the survey rod boot in accordance with one embodiment of the present invention.
Figure 9:
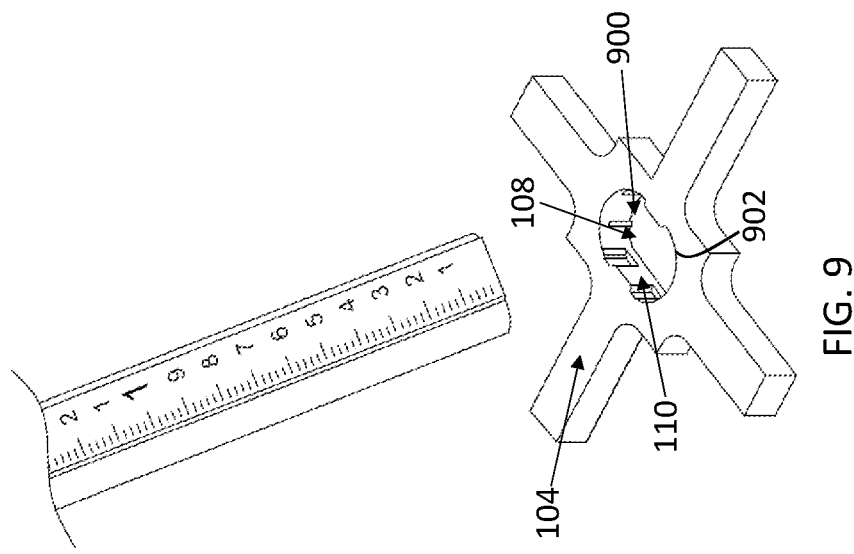
FIG. 9 is a perspective view of an exemplary survey rod uncoupled to the survey rod boot.

More specifically, when a user desires to measure a pipe, e.g., pipe 1200, he or she will insert the distal end 702 of the survey rod 700 into the receiving aperture 108 until the free distal end 702 of the survey rod 700 is flush with the lower surface 200 of the rod support body 102 (as best seen in FIG. 11). As discussed above, the body 102 may be of an elastically deformable material sufficient to expand when subjected to a compression force from within the inner sidewall 110. As such, a rod area 704 defined by a cross-section of the survey rod 700 along the rod length 706 may be greater than or equal to a receiving aperture area 900 defined by edges 902 of the rod support body 102 defining the receiving aperture 108 when the rod support body 102 is uncoupled with the survey rod 700 (as best seen in FIG. 9). Said another way, the receiving aperture area 900 may be less than or equal to the rod area 704. When the survey rod 700 is inserted in the body 102, the survey rod 700 may be frictionally retained by inner sidewall 110 of the survey rod boot 102 and maintained in an upright orientation with respect to the upper surface 104 or plane of the body 102.

With reference to FIGS. 3-4 and FIGS. 9-13, the plurality of indicia 704 corresponding to incremental distances disposed along the survey rod length 706 are disposed for viewing by the user. Those of skill in the art will appreciate that the survey rod 702 has a plurality of indicia 704 corresponding to incremental distances disposed along the rod length 706 (as represented best in FIGS. 7-8). The indicia 704 is efficacious for determining a length or distance and may be represented as a multiplicity of linear marking having associated distances in Metric or English measuring units. In other embodiments, the indicia 704 may be recesses, notches, or other indicia.

Figure 13:
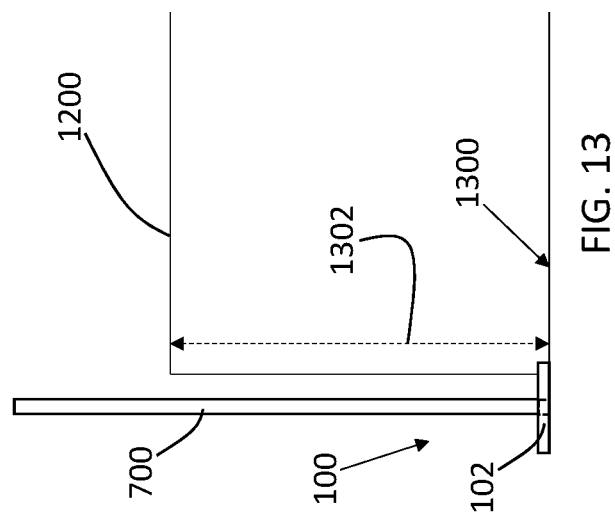
FIG. 13 is an elevational side view of the exemplary survey rod and survey rod boot proximally disposed in a measuring configuration with respect to a pipe in accordance with one embodiment of the present invention.
Figure 12:
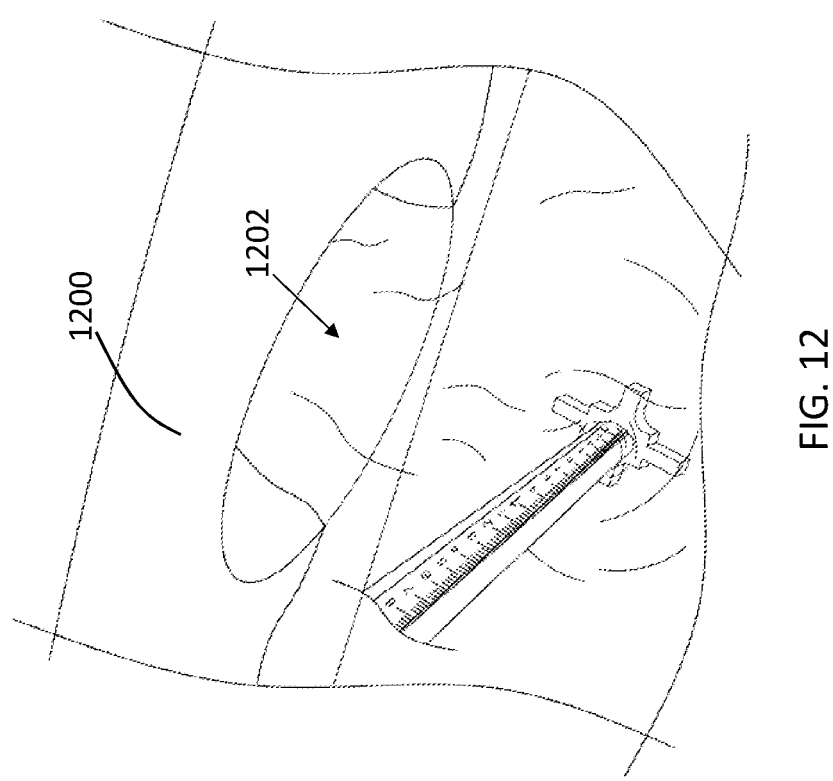
FIG. 12 is a perspective view of the exemplary survey rod and survey rod boot proximal to an exemplary pipe in accordance with one embodiment of the present invention.

The bottom surface(s) 402a-n of the cantilever member(s) 112a-n are operably configured to rest on an internal surface 1300 of the pipe invert 1200 to effectively, efficiently and safely measure a dimension of a pipe invert, e.g., the inner diameter 1302. FIG. 13 specifically depicts a measuring configuration with the assembly 100. Therefore, once the distal end 702 of the survey rod 700 is inserted into the body 102, preferably until the terminal distal end 702 surface is substantially flush or level with the bottom surface 200 of the support body 102, the user will then be able to place one of the cantilever member(s) 112a-n into an opening 1202 of the pipe invert 1200 where the bottom surface 402 of one of the cantilever member(s) 112a-n rests, is adjacent to, and/or is supported on the internal and/or external surface of the pipe 1200.

Thereafter, a length or dimension of the pipe 1200 can be measured effectively, safely, and efficiently. Said another way, once one of the cantilever member(s) 112a-n of the support body 102 is inserted into a pipe 1200 with the survey rod 700, the survey rod 700 is substantially plumb with respect to the surface of the pipe 1200 (a benefit not previous obtained with known methods and devices). To provide convenient and efficient measuring of various pipes, or pipe openings, the body 102 may include up to four cantilever member(s) 112a-n disposed in an x-shape or disposed at approximately orthogonal angles to another.

Although the figures show a specific order of executing the process steps, the order of executing the steps may be changed relative to the order shown in certain embodiments. Also, two or more steps may be carried out in succession or may be executed concurrently or with partial concurrence in some embodiments. Certain steps may also be omitted in figures for the sake of brevity. In some embodiments, some or all of the process steps may be combined into a single process.

As such, a survey rod boot assembly has been disclosed that enables users to effectively, safely, and efficiently measure dimensions associated with a pipe or pipe opening, particularly the invert level associated with the pipe. The survey rod boot is operably to selectively quickly couple and uncouple to a survey rod for fast and easy.

What is claimed is:
1. A survey rod boot assembly comprising:
a rod support body:
    with an upper surface, a lower surface opposing the upper surface of the rod support body, and a sidewall;
    defining a receiving aperture disposed on the upper surface of the rod support body;
    defining, with an enclosed inner sidewall of the rod support body, a receiving channel spanning from the receiving aperture into the rod support body, the enclosed inner sidewall of the rod support body of a deformably resilient material; and
at least one cantilever member projecting in a direction outwardly from the sidewall of the rod support body and terminating at a cantilevered free end, the at least one cantilever member having an upper surface and a lower surface opposing the upper surface of the at least one cantilever member and defining, with the lower surface of the rod surface body, a body resting plane.

2. The survey rod boot assembly according to claim 1, wherein:
the receiving channel span from the receiving aperture to an exit aperture disposed on the lower surface of the rod support body.

3. The survey rod boot assembly according to claim 2, wherein the rod support body further comprises:

a plurality of ribs projecting from the enclosed inner sidewall and into the receiving channel, the plurality of ribs disposed on opposing sides of the enclosed inner sidewall.

4. The survey rod boot assembly according to claim 2, wherein the enclosed inner sidewall further comprises:
at least one recessed platform having an upper surface and defining a receiving sub-channel spanning from the upper surface of the at least one recessed platform to the receiving aperture of the rod support body.

5. The survey rod boot assembly according to claim 2, wherein the enclosed inner sidewall further comprises:
a plurality of recessed platforms, each having an upper surface and defining a receiving sub-channel spanning from the upper surface of each respective plurality of recessed platforms to the receiving aperture of the rod support body, two of the plurality of recessed platforms disposed on opposing sides of the enclosed inner sidewall.

6. The survey rod boot assembly according to claim 1, wherein the support body further comprises:
a plurality cantilever members, each projecting in a direction outwardly from the sidewall of the rod support body, terminating at a cantilevered free end, having an upper surface, and having a lower surface opposing the upper surface of said cantilever member and defining, with the lower surface of the rod surface body, the body resting plane.

7. The survey rod boot assembly according to claim 6, wherein:
the body resting planes defined by each of the plurality of cantilever members and the lower surface of the rod surface body are co-planar.

8. The survey rod boot assembly according to claim 1, wherein the support body further comprises:
four cantilever members, each projecting in a direction outwardly from the sidewall of the rod support body, terminating at a cantilevered free end, having an upper surface, and having a lower surface opposing the upper surface of said cantilever member and defining, with the lower surface of the rod surface body, the body resting plane, wherein each of the four cantilever members are disposed at substantially orthogonal orientations with respect to two adjacent cantilever members.

9. The survey rod boot assembly according to claim 8, wherein:
the body resting planes defined by each of the four cantilever members and the lower surface of the rod surface body are co-planar.

10. The survey rod boot assembly according to claim 1, further comprising:
a survey rod having a free proximal end, a free distal end opposing the free proximal end, a rod length separating the free proximal and distal ends of the survey rod, and a front face with a plurality of indicia corresponding to incremental distances disposed along the rod length, wherein the receiving aperture is shaped and sized to receive the free distal end of the survey rod and the rod support body is selectively removably coupled to the survey rod.

11. The survey rod boot assembly according to claim 10, wherein:
the free distal end of the survey rod is flush with the lower surface of the rod support body.

12. The survey rod boot assembly according to claim 11, further comprising:

a rod area defined by a cross-section of the survey rod along the rod length; and
a receiving aperture area defined by edges of the rod support body defining the receiving aperture when the rod support body is uncoupled with the survey rod, the receiving aperture area less than or equal to the rod area.

13. In combination with a survey rod having a free proximal end, a free distal end opposing the free proximal end, a rod length separating the free proximal and distal ends of the survey rod, and a front face with a plurality of indicia corresponding to incremental distances disposed along the rod length, the improvement comprising:
a rod support body:
with an upper surface, a lower surface opposing the upper surface of the rod support body, and a sidewall;
defining a receiving aperture disposed on the upper surface of the rod support body;
defining, with an enclosed inner sidewall of the rod support body, a receiving channel spanning from the receiving aperture into the rod support body, the receiving aperture and the receiving channel with the survey rod disposed therein and the survey rod frictionally retained by, and selectively, removably, and directly coupled to, the enclosed inner sidewall of the rod support body; and
at least one cantilever member projecting in a direction outwardly from the sidewall of the rod support body and terminating at a cantilevered free end, the at least one cantilever member having an upper surface and a lower surface opposing the upper surface of the at least one cantilever member and defining a body resting plane.

14. The improvement according to claim 13, wherein:
the lower surface of the at least one cantilever member, with the lower surface of the rod surface body, defines the body resting plane.

15. The improvement according to claim 13, wherein:
the enclosed inner sidewall of the rod support body is of a deformably resilient material.

16. The improvement according to claim 13, wherein:
the free distal end of the survey rod is flush with the lower surface of the rod support body.

17. The improvement according to claim 13, further comprising:
a rod area defined by a cross-section of the survey rod along the rod length; and
a receiving aperture area defined by edges of the rod support body defining the receiving aperture when the rod support body is uncoupled with the survey rod, the receiving aperture area less than or equal to the rod area.

18. The improvement according to claim 13, wherein the support body further comprises:
four cantilever members, each projecting in a direction outwardly from the sidewall of the rod support body, terminating at a cantilevered free end, having an upper surface, and having a lower surface opposing the upper surface of said cantilever member and defining, with the lower surface of the rod surface body, the body resting plane, wherein each of the four cantilever members are disposed at substantially orthogonal orientations with respect to two adjacent cantilever members.

* * * * *